United States Patent [19]
Prout et al.

[11] Patent Number: 5,776,405
[45] Date of Patent: Jul. 7, 1998

[54] METHOD FOR MOLDING A ROTATIONALLY-MOLDED CONTAINER

[75] Inventors: J. Timothy Prout, Winston-Salem; Todd E. Wright; Smith E. Trent, III, both of Statesville; Anthony J. Brescia, Huntersville; Jerry E. Lambert, Statesville, all of N.C.

[73] Assignee: Toter, Inc., Statesville, N.C.

[21] Appl. No.: 758,181

[22] Filed: Nov. 25, 1996

Related U.S. Application Data

[63] Continuation-in-part of Ser. No. 439,308, May 11, 1995, Pat. No. 5,582,322, which is a continuation of Ser. No. 238,635, May 5, 1994, Pat. No. 5,538,158.

[51] Int. Cl.$^6$ .......................................... B65D 43/14
[52] U.S. Cl. .................. 264/310; 220/675; 220/771; 220/908; 264/311
[58] Field of Search .................... 220/675, 771, 220/908; 264/310, 311

[56] References Cited

U.S. PATENT DOCUMENTS

| | | | |
|---|---|---|---|
| 4,930,649 | 6/1990 | Moser | 220/338 |
| 4,953,744 | 9/1990 | Koyama | 220/404 |
| 5,071,024 | 12/1991 | Delmerico et al. | 220/335 |
| 5,141,124 | 8/1992 | Smith et al. | 220/335 |
| 5,323,923 | 6/1994 | Schauer | 220/337 |
| 5,538,158 | 7/1996 | Prout et al. | 220/771 |
| 5,582,322 | 12/1996 | Prout et al. | 220/771 |

*Primary Examiner*—Steven M. Pollard
*Attorney, Agent, or Firm*—Finnegan, Henderson, Farabow, Garrett, & Dunner, L.L.P.

[57] ABSTRACT

In a rotationally-molded thermoplastic refuse container of the type having a hollow handle integrally-molded with a refuse carrying compartment of the container, the improvement which includes a wall integrally-formed with the refuse container and sealingly enclosing the hollow handle from communication with the refuse-carrying compartment of the container for providing greater strength to the container and preventing refuse from lodging in the hollow handles.

3 Claims, 11 Drawing Sheets

METHOD FOR MOLDING A ROTATIONALLY-MOLDED CONTAINER

CROSS-REFERENCE TO RELATED APPLICATIONS

The present application is a Continuation-in-part of U.S. application Ser. No. 08/439,308, filed May 11, 1995, now U.S. Pat. No. 5,582,322, issued Nov. 26, 1996, which is a continuation of U.S. application Ser. No. 238,635 filed May 5, 1994 now U.S. Pat. No. 5,538,158, issued Jul. 23, 1996.

TECHNICAL FIELD AND BACKGROUND OF THE INVENTION

This invention relates to a rotationally-molded refuse container with an integrally-molded handle sealed from communication with the refuse compartment of the container. Rotational molding provides advantages not present in other molding processes, such as blow-molding and injection molding. Rotational molding generally provides economical tooling costs, one-piece, stress-free and light-weight construction, uniform wall thickness, the ability to produce multi-wall and complex hollow parts and to include metal inserts as integral parts, products with resistance to stress-cracking and corrosion, and the ability to design products with minor undercuts without draft angles being required.

Rotational molding takes place by melting a thermoplastic resin, such as polyethylene or polypropylene powder or pellets, in a biaxially-rotating, heated mold. The interior shape of the mold corresponds generally with the shape of the product to be molded. The particles of thermoplastic resin melt and puddle in the bottom of the mold. As the mold is rotated simultaneously through a vertical and horizontal axis, all parts of the mold rotate through this puddle of thermoplastic resin, causing a thin layer of the material to coat the inner surface of the hot mold surface and fuse to the mold in layers. The process continues with the fused layers becoming progressively thicker until the desired product thickness is achieved and the layers have taken on the shape of the mold being used to form the product. A principal characteristic of a typical rotationally-molded product is that it is hollow. The thickness of the walls of the molded product is controlled by the amount of powder and/or pellets with which the mold is charged before the biaxial rotation of the mold begins.

After the all of the charge has melted and fused to the interior walls of the mold, the mold is moved to a cooling chamber where the mold is cooled by air, water or a mist of the two. The part in the mold cools to the point where the mold can be opened and the part removed.

Rotational molding must be carefully distinguished from blow molding. In general, the blow molding process is carried out by extruding a hollow, tubular-shaped, thermoplastic preform, referred to as a "parison", from an extrusion machine into the interior of an open mold. The walls of the mold are then closed and a gas, such as air, is blown into the mold and into the preform. The expansion of the gas under pressure causes the preform to expand and move outwardly against the interior walls of the mold. The shape of the interior walls of the mold define the shape of the product to be molded, and the thickness of the product can be controlled by controlling the shape and size of the parison. Protrusions, which may be internal or external to the body of the product being molded, provide strength and rigidity to the product. Wall thickness and distribution of the material throughout the product is controlled by the shaping of the extrusion die. Blow molding molds can have moveable segments which pinch off pieces of the parison and form it into solid forms, which can be used for reenforcing areas of the product or providing greater rigidity. It is also possible to pinch off areas in such a way as to create enclosed voids in the product being molded. This permits a considerable increase in strength while minimizing weight gain.

Rotational molding does not lend itself quite so easily to the formation of enclosed voids. By definition, full and even fusion of the thermoplastic material to the inner walls of the mold requires that all areas of the mold be open to being coated as a particular part of the mold passes through the puddle of molten thermoplastic material.

This application presents a processing step which permits a hollow area to be closed off from adjacent hollow areas by a solid wall, while nevertheless providing full opportunity for all areas of the mold to be properly coated with thermoplastic material during the molding process. In the example provided in the application, a hollow handle of a roll-out refuse container is sealed off from the refuse compartment.

SUMMARY OF THE INVENTION

Therefore, it is an object of the invention to provide a rotationally-molded container which permits a hollow area to be closed off from adjacent hollow areas by a solid wall.

It is another object of the invention to provide a rotationally-molded container which includes void areas sealed off from contamination from refuse in a adjacent refuse compartment.

It is another object of the invention to provide a rotationally-molded refuse container which includes a handle which is integrally-molded with a refuse-carrying compartment of the container, and which also includes a wall integrally-formed with the refuse container and sealingly enclosing the hollow handle from communication with the refuse-carrying compartment of the container for providing greater strength to the container and for preventing refuse from lodging in the hollow handles.

These and other objects of the present invention are achieved in the preferred embodiments disclosed below by providing in a rotationally-molded thermoplastic refuse container of the type having a hollow handle integrally-molded with a refuse-carrying compartment of the container, the improvement which comprises a wall integrally-formed with the refuse container and sealingly enclosing the hollow handle from communication with the refuse carrying compartment of the container for providing greater strength to the container and preventing refuse from lodging in the hollow handles.

According to one preferred embodiment of the invention, the hollow-handle joins to the refuse-carrying compartment of the container at three spaced-apart points along a rear side of the refuse container, and wherein the wall comprises three wall segments, one of the three wall segments respectively sealingly enclosing the hollow handle at the three spaced-apart points along the rear side of the refuse container.

According to another preferred embodiment of the method according to the invention, a refuse container of the type having a hollow handle integrally-molded with a refuse-carrying compartment of the container is formed by rotational molding. The improved process includes the step of forming an integral wall of thermoplastic material during rotation of the mold, which wall sealingly encloses the hollow handle from communication with the refuse-carrying compartment of the container while providing greater strength to the container and preventing refuse from lodging in the hollow handles.

Preferably, the method includes the step of providing flow-controlling openings or slots in the mold at the area of the junction of the handle and the refuse-carrying compartment of the container for controlling the flow of the thermoplastic material along the junction of the handle and the refuse-carrying compartment to cause a void at the junction to close as the rotation of the mold occurs.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 6:
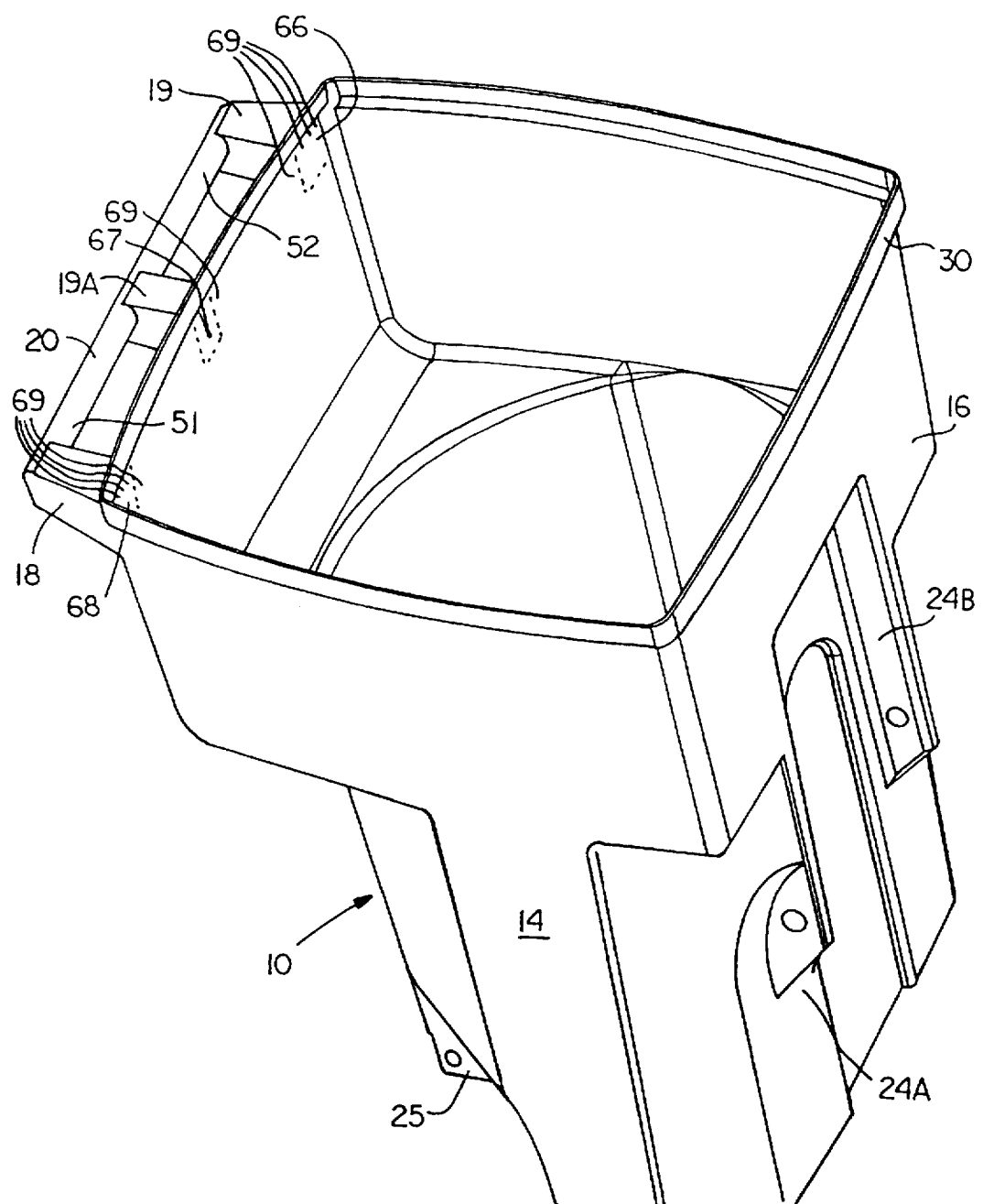
FIG. 6 is a top perspective view of a refuse container according to another embodiment of the invention, with the lid removed, showing the integrally-molded handle sealed from communication with the refuse compartment of the container.

Referring now specifically to the drawings, a rotationally-molded refuse container with an integrally-molded handle sealed from communication with the refuse compartment of the container according to the present invention is illustrated in FIGS. 1-4 and shown generally at reference numeral 10. A very similar rotationally-molded refuse container with an integrally-molded handle sealed from communication with the refuse compartment of the container is shown in FIG. 6 and indicated at reference number 10', similar parts also being noted in prime notation.

In the description that follows, reference is made to the novel features of the invention as illustrated in connection with a single size of container, as illustrated in the drawings. All of the features illustrated, even though only in relation to one size and style of container, are equally applicable to many different styles and sizes of containers.

The term "refuse container" is used in this application in the broad sense to refer to a container useful for receiving and holding garbage, trash, recyclable items such as paper, bottles, cans, and the like, medical disposables, laundry or other bulk items or products. The particular embodiment disclosed in this application is suitable for the above purposes, and is provided with wheels to facilitate rolling movement of the refuse container 10.

Container 10 may be fabricated of medium to high density polyethylene with an nominal wall thickness of 0.160±030 inches (0.41±08 cm.). One suitable formula for manufacture of the refuse container 10 is set out below.

Container 10 is rotationally-molded in order to achieve maximum utilization of raw materials, and to create a light-weight, strong container. As is shown in FIGS. 1-4, container 10 has an integrally-formed, rotationally-molded body 11 which includes a bottom wall 12, opposed side walls 13 and 14, a rear wall 15 and a front wall 16. The volume enclosed by the container 10 is sufficient to hold approximately 96 gallons (363 liters). As is illustrated, the walls 13-16 are provided with relief areas which provide stiffening to the relatively thin walls. The walls 13-16 terminate to form a container mouth which is covered by a pivotal, hinged lid 17. Handle supports 18, 19 and 19A are molded into the container body 11 adjacent the upper ends of the walls 13-16. These handle supports 18 and 19 are integrally-formed with and at the same time as the formation of the container body 11. The handle supports 18 and 19 support a laterally-extending and integrally-formed cylindrical handle bar 20 which is also rotationally-molded during the same process.

Figure 4:
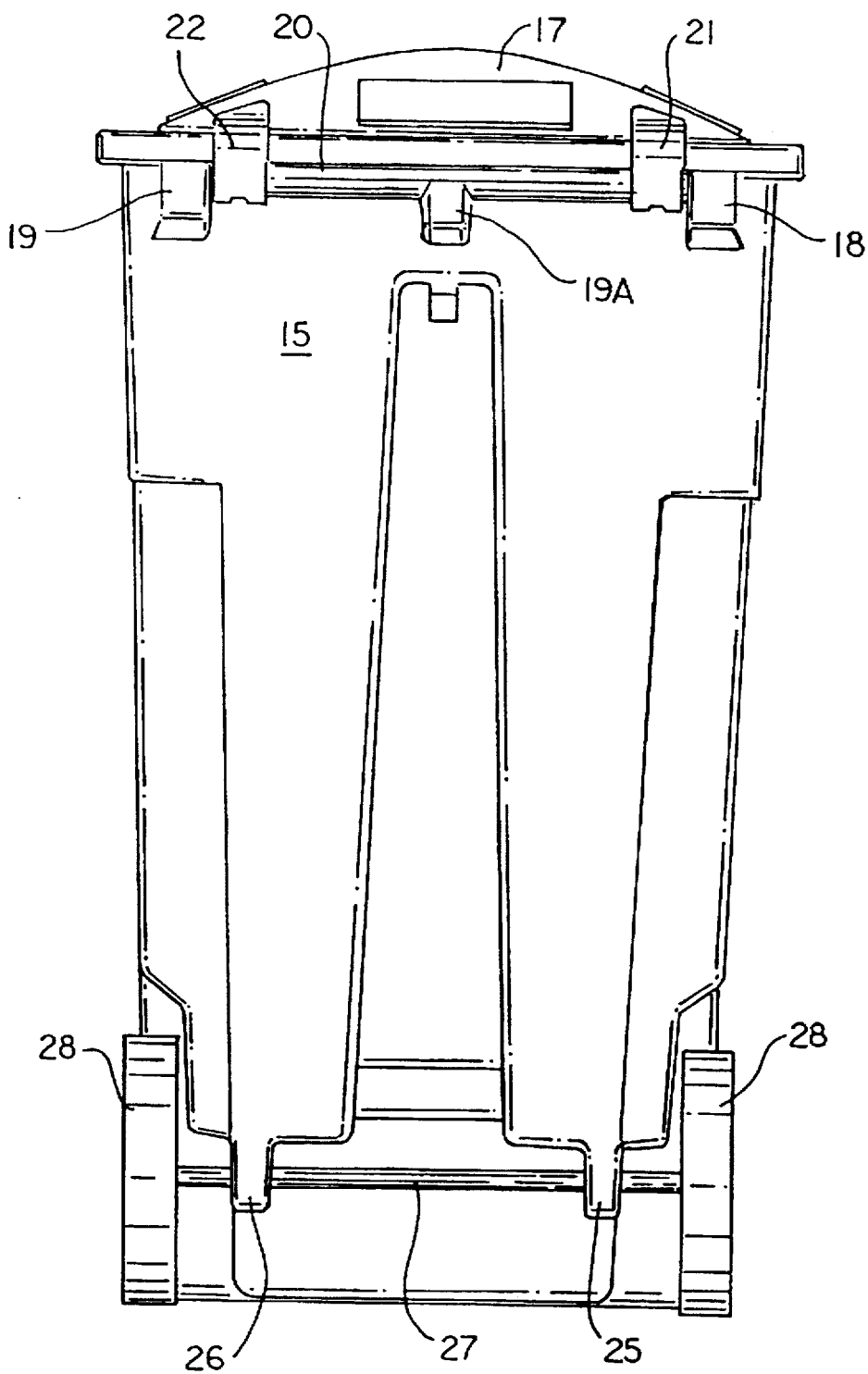
FIG. 4 is a rear elevation of the refuse container shown in FIG. 1.

As is generally shown in FIG. 4, lid 17 is attached to handle bar 20 by hinge means, which comprise first and second hinges 21 and 22 which extend outwardly from the rear side of lid 17. Hinges 21 and 22 are integrally-molded into lid 17, and as is shown in particular in FIG. 1, extend into the lid 17 itself and provide reenforcement to lid 17.

Figure 1:
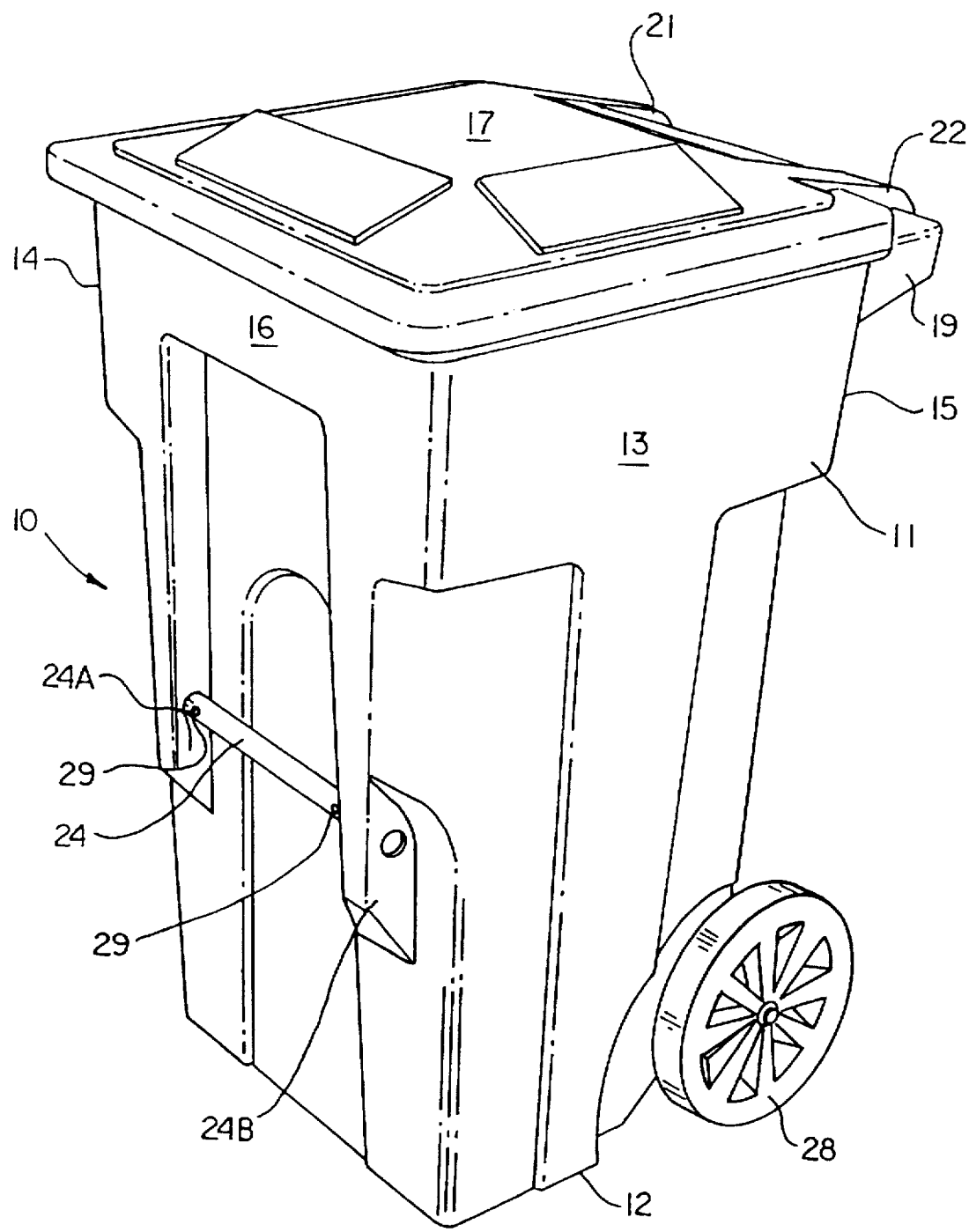
FIG. 1 is a perspective view of a rotationally-molded refuse container according to an embodiment of the invention.
Figure 2:
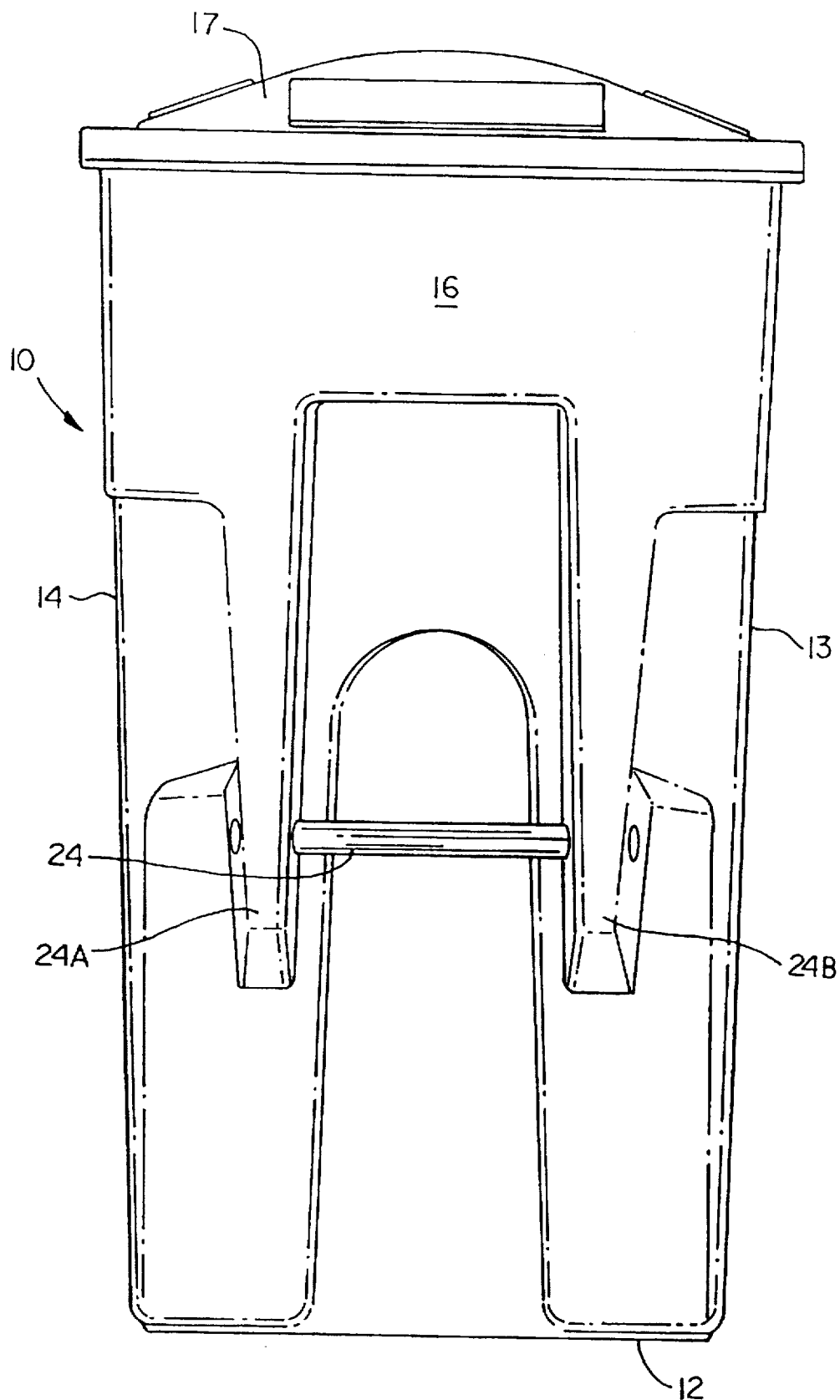
FIG. 2 is a front elevation of the refuse container shown in FIG. 1.
Figure 3:
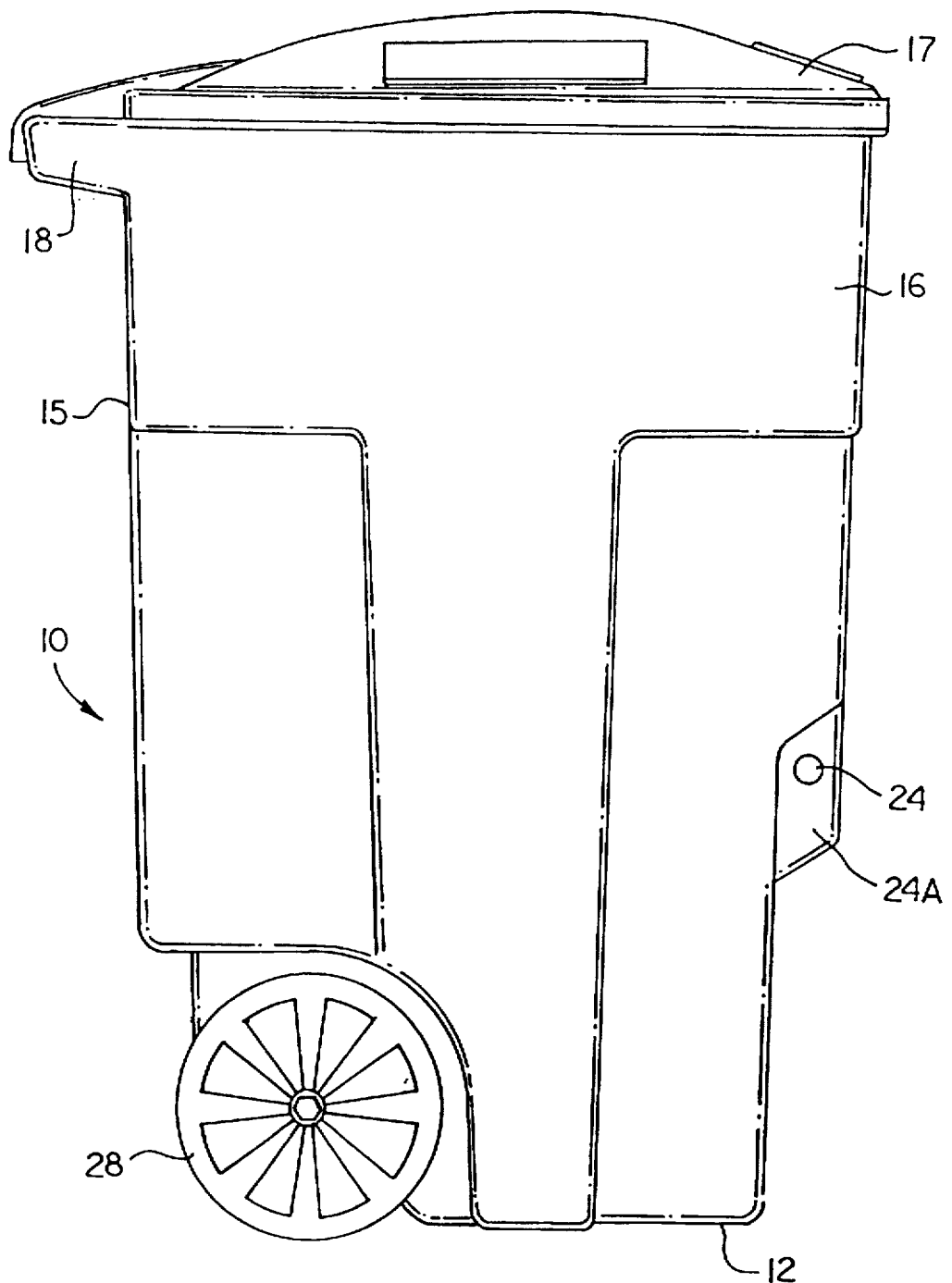
FIG. 3 is a side elevation of the refuse container shown in FIG. 1.

The front wall of container 10 is provided with a laterally-extending metal lock bar 24 which is fitted to the container 10 and permits emptying by a hydraulic lift unit. The lock bar 24 is positioned in a pair of spaced-apart lock bar journals 24A and 24B which are integrally-molded into the front wall 16. As is shown in FIG. 1, the lock bar 24 is positioned in the lock bar journals 24A and 24B. The annular openings defined by the lock bar journals 24A and 24B have respective draft angles to permit easy insertion of the lock bar 24.

Figure 8:
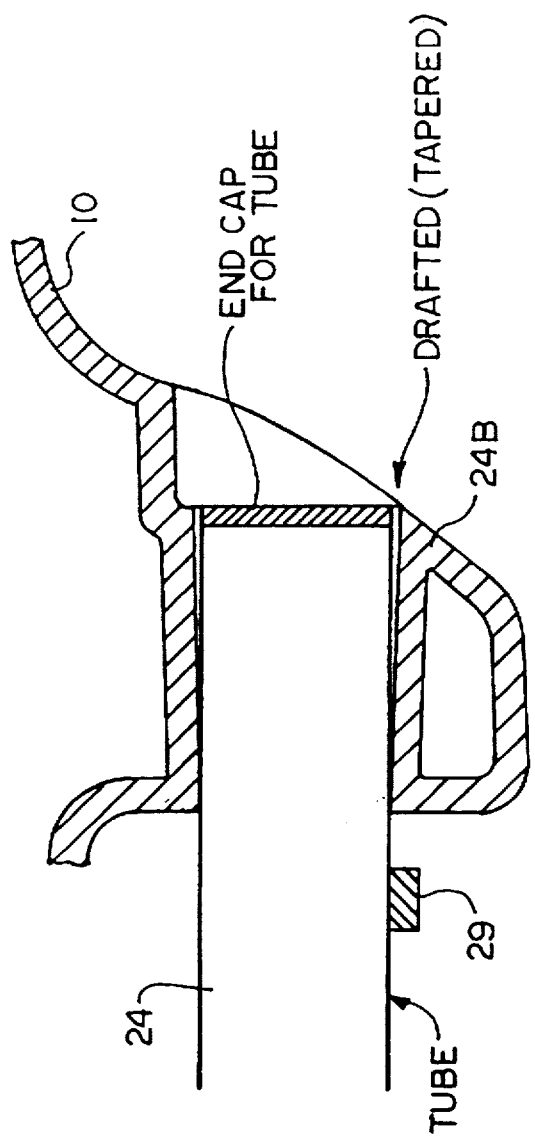
FIG. 8 is a horizontal cross-section through one of the lock bar journals on the front wall of the container shown in FIG. 6.

As is also shown in FIG. 1, a pair of plastic rivets 29 are inserted into holes in the lock bar 24 in closely spaced-apart relation to the lock bar journals 24A and 24B. The rivets 29 are close enough to the lock bar journals 24A and 24B to prevent the lock bar 24 from coming out, but far enough away to permit free, non-binding movement of the lock bar 24. In addition, the lock bar 24 freely rotates in the lock bar journals 24A and 24B. If a lifting hook of a lift unit lifting or lowering the container 10 should clamp onto the top of the lock bar 24 instead of passing behind the lock bar 24, the rotating capability of the lock bar 24 permits the lock bar 24 to move sufficiently to allow the lifting hook to move into its proper position. The bottom of the rear wall 15 of container 10 includes integrally-formed axle journals 25 and 26 which receive an axle 27 on which is mounted a pair of wheels 28. Similar structure is shown in FIG. 8 with relation to container 10', with like components shown in prime notation.

As is shown in FIG. 6, the mouth of the container 10' is defined by an upwardly-extending rim 30 which provides a means of correctly positioning lid 17 onto the top of container 10'. Rim 30 is a part of and lies in the plane of the respective walls 1316 of the container 10'.

Figure 9:
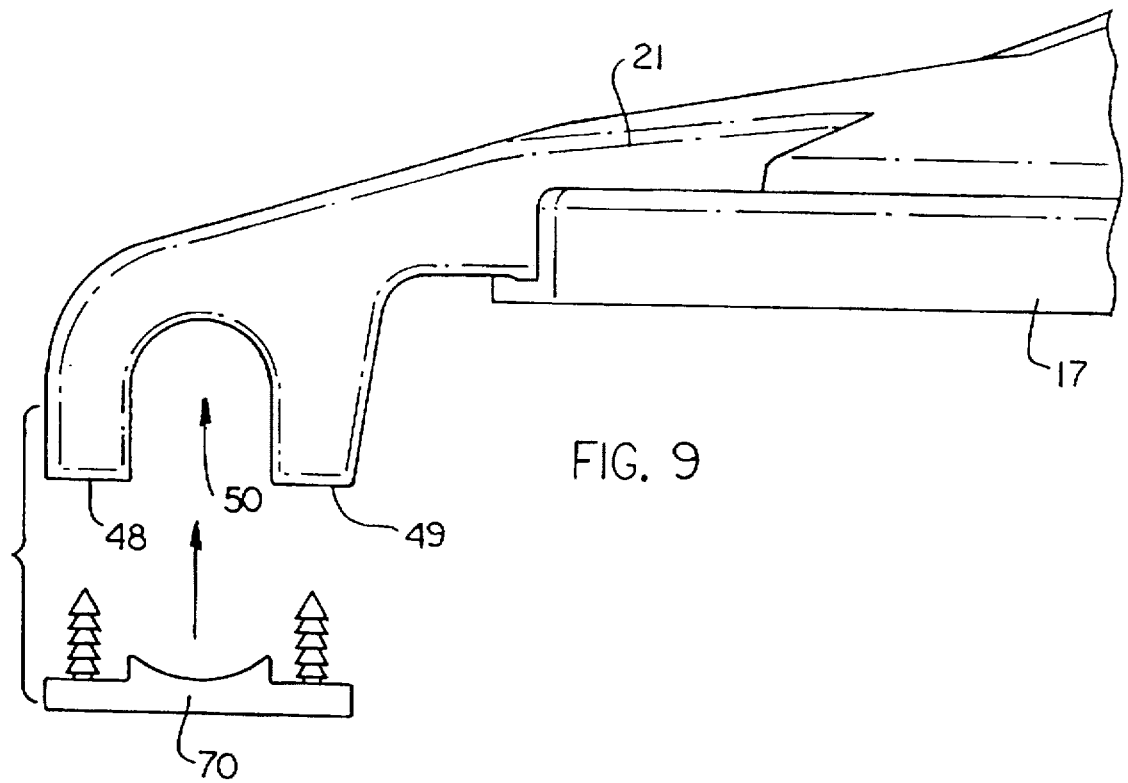
FIG. 9 is a fragmentary side elevation of the hinge claws of the lid hinges and lid strap.
Figure 10:
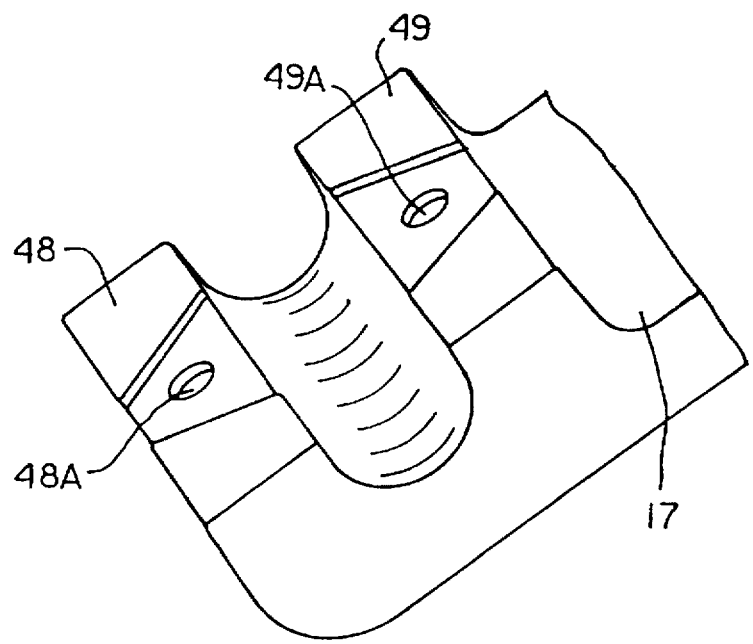
FIG. 10 is a fragmentary, enlarged view of the underside of the hinge claws of FIG. 9.

FIG. 9 illustrates that the hinges 21 and 22 of the container 10 are each formed of hinge claws 48 and 49 which define an annular opening 50 therebetween. As is shown in FIG. 6, handle bar 20 includes a pair of diameter hinge-receiving areas 51 and 52 on opposite ends of handle bar 20. Hinge receiving areas 51 and 52 are sized to be received within the openings 50 of hinges 21 and 22 respectively. The distance between hinge claws 48 and 49 is somewhat larger than the diameter of the hinge-receiving areas 51 and 52. Hinges 21 and 22 are place directly over the respective hinge receiving areas 51 and 52. Once the hinges 21 and 22 are in place, lid 17 can be opened and closed, the lid 17 pivoting about the axis defined by handle bar 20.

As is shown in FIG. 9, attachment straps 70 are placed into holes 48A and 49A to keep the lid 17 from being removed or from falling off.

Figure 5:
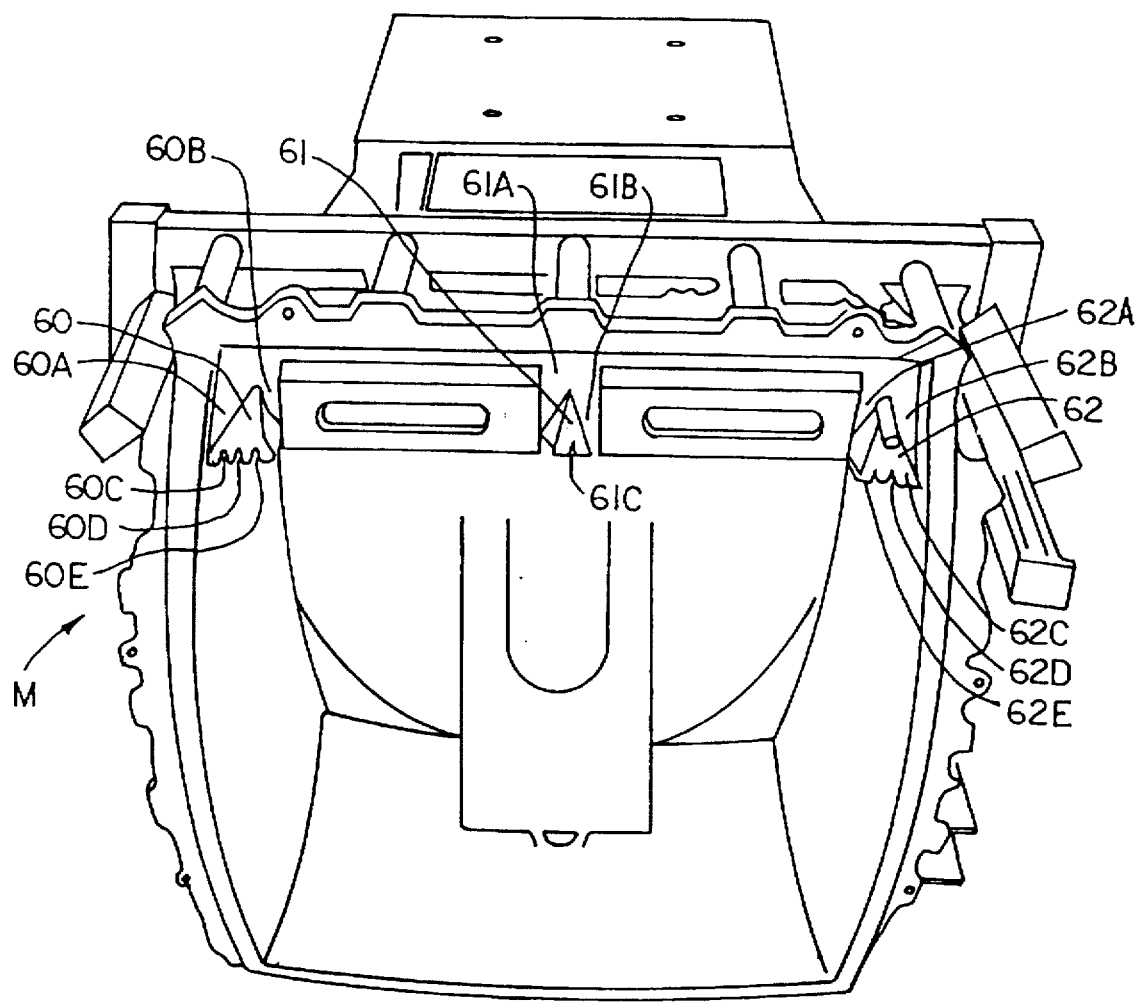
FIG. 5 is a view of a mold in which a refuse container of the general type shown in FIGS. 1-4 is molded.

Referring now to FIG. 5, a mold "M" is shown, in which a container of the general type of container 10 is molded. As noted above, handle supports 18, 19 and 19A are molded into the container body 11 adjacent the upper ends of the walls 13–16. These handle supports 18 and 19 are integrally-formed with and at the same time as the formation of the container body 11. Ordinarily, there would be openings on the back side wall of the refuse carrying compartment communicating with the handle 20 through the handle supports 19, 19A and 21. This would be a requirement for permitting communication of the area of the handles with the molten thermoplastic resin during molding. The openings actually represent access areas for flow of molten resin during molding. However, these openings also permit refuse to become lodged in the hollow handle area, creating odor and lack of proper cleanliness. These openings can also contribute to weakness in the handle area by permitting relatively large, unsupported areas in the handle.

Figure 7:
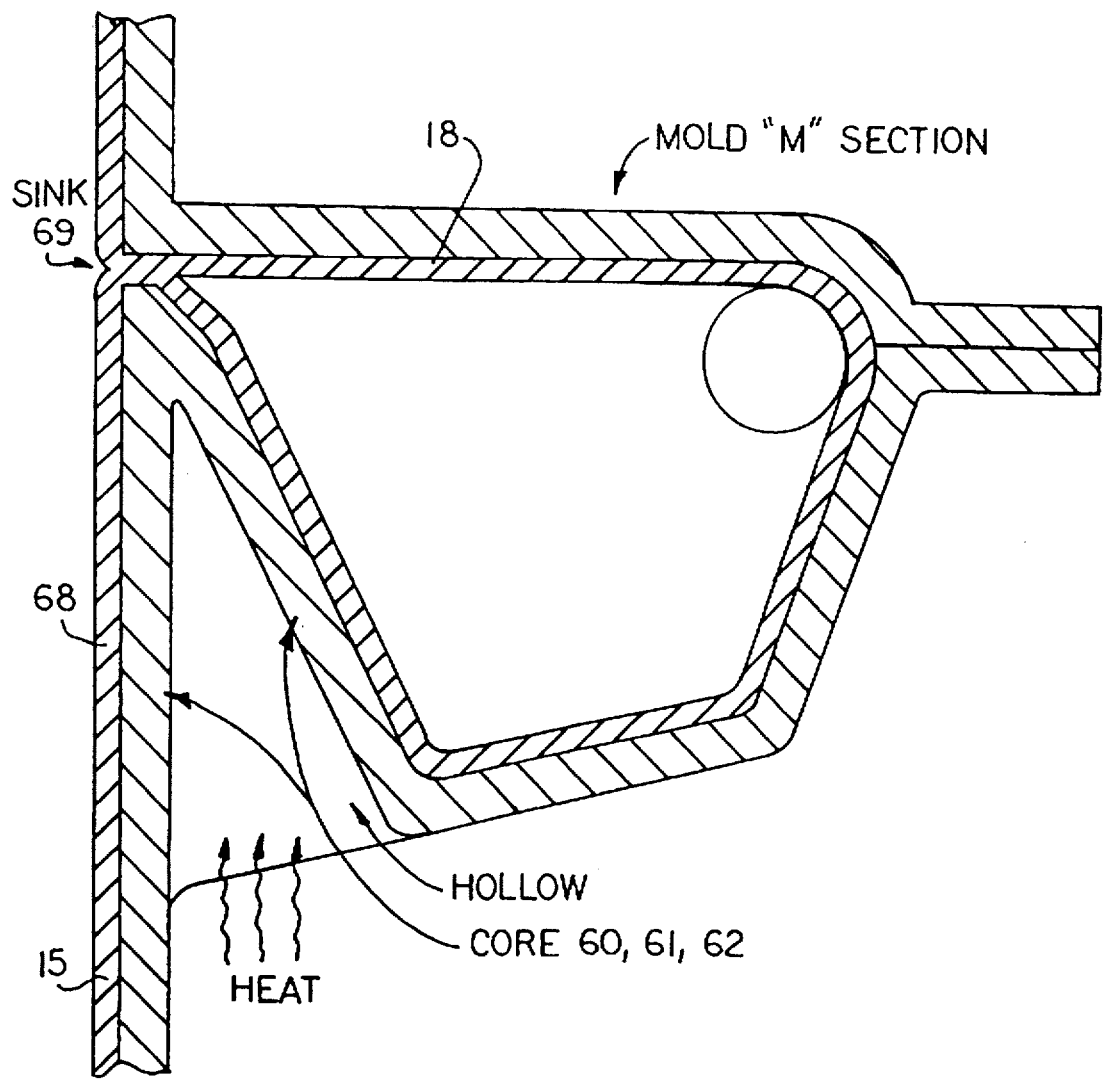
FIG. 7 is a vertical cross-section through the integrally-molded handle of the container shown in FIG. 6.

In accordance with the invention, therefore, cores 60, 61 and 62 are positioned in the access openings between the refuse carrying portion and the handle portion of the mold "M". These cores each have two tapered side cuts 60A, 60B, 61A, 61B and 62A, 62B, respectively, between the cores and the adjacent side walls of the mold "M". Cores 60 and 62 have three short flow openings 60C, 60D, 60E and 62C, 62D, 62E, respectively in the upper ends thereof. Core 61, which is narrower than cores 60 and 62, and forms a narrower center handle support 19A, has a single flow opening 61C. Cores 60, 61 and 62 are hollow in order to allow heat to flow to the core walls. See FIG. 7.

The face of the cores 60, 61 and 62 communicating with the refuse-carrying compartment portion of mold "M" are in the same plane as the surrounding mold walls. As the mold is biaxially rotated, molten material flows in, around and behind the cores 60, 61 and 62. The side cuts and flow openings permit material to flow into the handle and handle support areas of the mold "M", forming the handle 20 and the handle supports 19, 19A and 21 in a conventional manner. As the mold "M" rotates, material accumulates on the face of the cores 60, 61 and 62 and fills in the side cuts 60A, 60B, 61A, 61B and 62A, 62B and flow openings 60C, 60D, 60E, 61C and 62C, 62D, 62E. This occurs progressively during the molding cycle, causing the side cuts and openings to fill in, or "bridge". The particle size and constituents of the charge of thermoplastic material are selected to facilitate this process and result.

The center handle support 19A (FIG. 4) provides an additional access opening for the thermoplastic resin material to flow into the area of the handle 20 during molding, thus promoting uniform thickness of the material forming the handle 20. A vent 65 permits air pressure to remain equal on both sides of the cores 60, 61 and 62 as molding occurs.

Once the thermoplastic resin material has accumulated on the face of the cores 60, 61 and 62 and filled in the side cuts 60A, 60B, 61A, 61B and 62A, 62B and flow openings 60C, 60D, 60E, 61C and 62C, 62D, 62E, the void area defining the interior of the handle 20 and the handle supports 18, 19 and 19A is completely walled off from the area of the container defining the refuse compartment. As is shown in FIG. 6, the access areas to the handle supports 18, 19 and 19A enclosed by walls 66, 67 and 68. The material forming the walls 66, 67, and 68 is delineated from the surrounding material by sinks 69. Sinks 69 are slight linear depressions where the material has shrunk slightly during cooling. See also FIG. 7.

As noted above, the thermoplastic resin material with which the mold "M" is charged is selected to optimize the process described above by which the handle and handle support areas are walled off from the area of the container defining the refuse compartment. The resin charge comprises a blend of powdered resin particles having an average diameter of 600±300 microns, and micropellets having an average diameter of 1.0±0.3 mm. The powder material melts first and begins initial formation of the coating on the interior of the mold "M". The powder material has a surface which is very irregular, with many outwardly projecting hair-like structures which cause the powder particles to cling to each other and to surfaces with which they come in contact.

The much larger micropellets take longer to melt and therefore continue to roll around in the mold "M" after the powder particles have fused to each other and have coated the mold "M". The larger, slower melting micropellets prevent premature bridging of the cuts 60A, 60B, 61A, 61B and 62A, 62B and flow openings 60C, 60D, 60E, 61C and 62C, 62D, 62E, thus permitting material flow into the handle and handle support area, thus insuring complete formation of sufficiently thick walls in these areas.

A suitable formula for achieving the above-described results according to the above-described process in the rotational molding of a 96 gallon roll-out refuse container is described below. Literature has indicated that many materials may be used in forming a part via rotational molding. These materials include polyvinyl chloride (PVC); polyethylene (PE); polypropylene (PP); and unique thermoplastics such as "Surlyn", brand name for a particular thermoplastic material manufactured by DuPont. Experience has taught that the most practical and widely-used material for the formation of a rollout refuse container is polyethylene. However, polyethylene, both in the form of homopolymers and copolymers, as supplied by major resin producers, usually do not provide an overall balance of physical properties, such as stiffness, viscosity, notch impact, ESCR (Environmental Stress Crack Resistance) low temperature (−40° F.) impact, and flexure fatigue resistance required for premium-performing rollout refuse containers.

Figure 11:
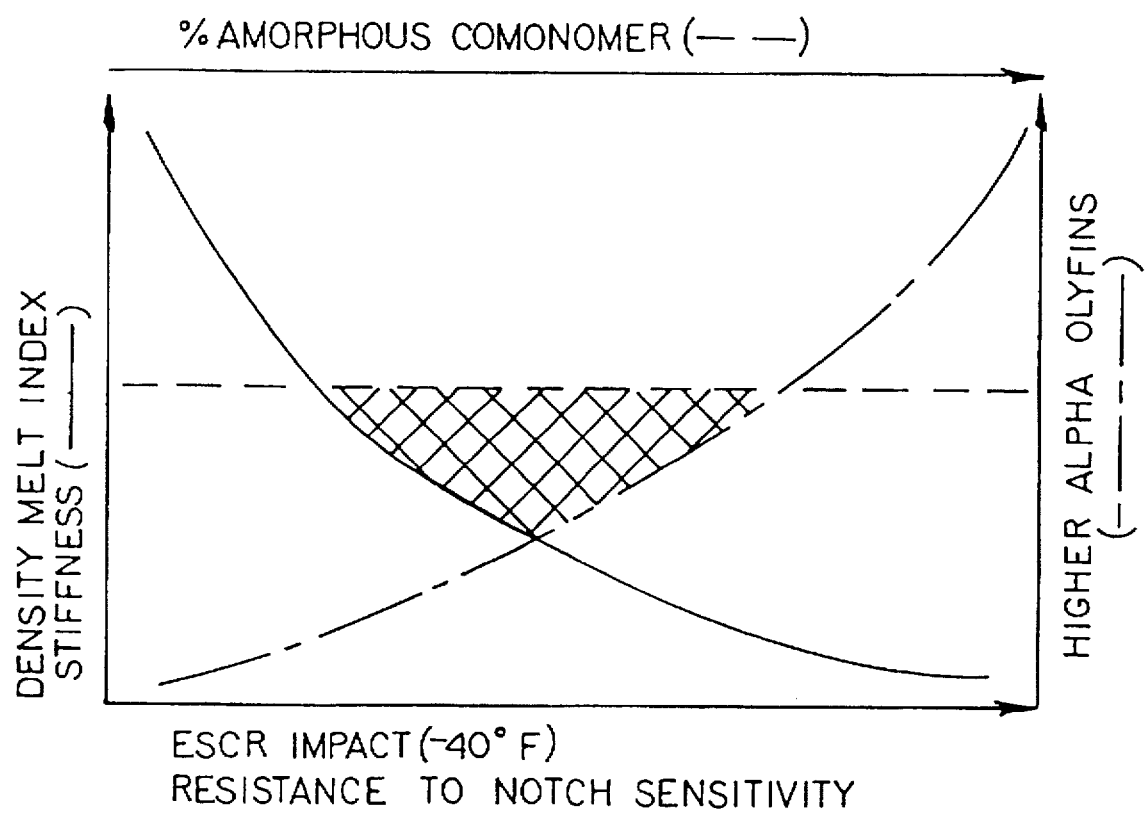
FIGS. 11 and 12 are graphical representations of the physical properties of the material used to mold the container.

As can be seen in FIG. 11, applicant has been able to maximize physical properties and performance by alloying and compounding various materials.

Particle size and particle size-to-density ratio is critical, and is maintained at 20 mesh±15, while maintaining an inverse density-to-size ratio. Oven temperatures of 700°±100 F.° are maintained in order to control polymer melt temperatures of 475°±75 F°.

Figure 12:
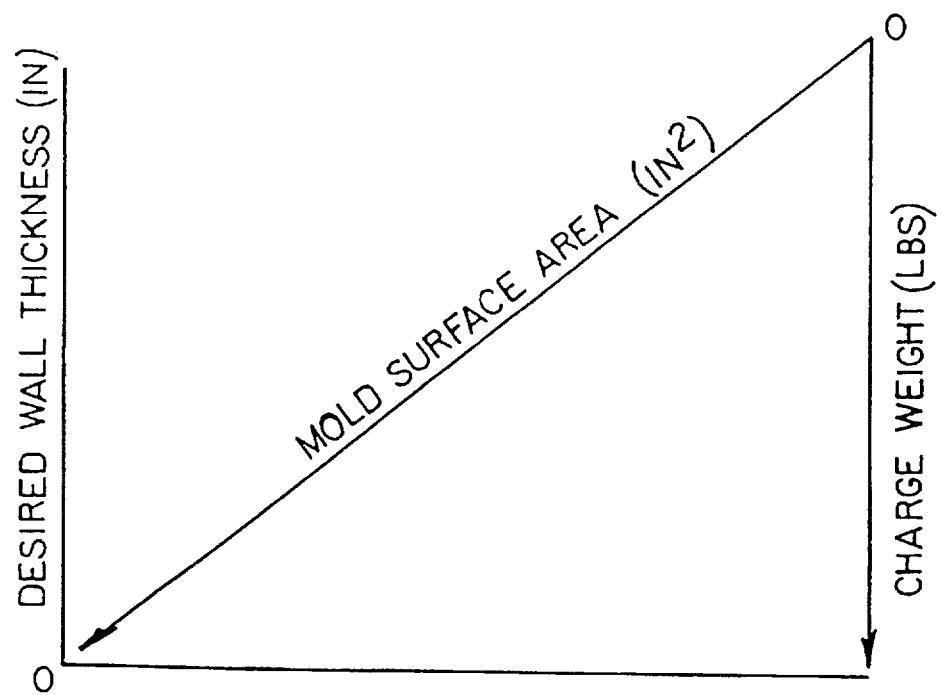

Charge weights are based upon specified final part weight and can be approximated using FIG. 12.

Proper rotation is determined by part geometry. When the longest dimension of a part is parallel to the major axis, the major axis speed will be greater than the speed of the minor axis. A common ratio is 3.75:1 or multiples thereof. It is critical that even divided ratios be avoided to allow for even laydown or dispersion of the melt.

While the present invention and molding composition solved numerous problems, there remained a need to eliminate or replace the powdered resin particles. Manufacturing powdered resin is expensive due to the grinding time and equipment costs. In addition, the quality of the powdered resin changes as the equipment, especially screens, ages during use. Thus, substantial testing was performed to develop a micropellet of reduced size (referred to as "mini-micropellets" below), which could be economically and consistently manufactured like traditional micropellets while, at the same time, perform substantially like the powdered resin particles utilized in the parent invention.

The improved resin charge comprises a blend of mini-micropellets having an average diameter of 700 microns and a diameter range of between about 600 to 1000 microns. The micropellets again have an average diameter of 1.0±0.3 mm. In operation, the mini-micropellets, like the original powder material, melts first and begins initial formation of the coating on the interior of the mold "M".

While it is very difficult to characterize such small particle, visual examination of both particles indicate that the length to diameter ratio of each type of particle is about 1.

In addition, the flow characteristics of the two types of particles differ in unexpected ways. For example, while the Angle of Repose of the mini-micropellets was about the same as that for the micropellets (about 30°), the flow analysis of 100 gms through a 0.457 inch orifice was only 15.3 seconds vs. 17.2 seconds for the micropellets. This is a difference of almost 2 seconds! A smaller (0.298 inch) orifice (50 gms. charge weight) yielded about a 1 second difference which, based on the lower charge weight, is about the same result. Thus, the flow analysis time to pass through a funnel orifice of between about 0.3 to 0.5 inches of the mini-micropellets is less than about 90% of the micropellets.

The magnitude of this difference, in view of the similarity of the angle of repose of the two types of particles, is completely unexpected and may explain why the mini-micropellets can be substituted for the powder resin particles of the parent invention.

Of course, numerous other sizes, shapes and configurations of containers can be molded according to the principles described above without departing from the scope of the invention.

A rotationally-molded refuse container with an integrally-molded handle sealed from communication with the refuse compartment of the container is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A method of molding a plastic container having a hollow protrusion integrally-molded with a material carrying compartment of the container, comprising the steps of:

rotationally molding the container in a mold containing a blend of plastic material consisting essentially of micropellets having diameters in the range of from 600 microns to 1300 microns; and forming a wall integrally with the container and sealingly enclosing the hollow protrusion from communication with the material carrying compartment of the container for providing greater strength to the container and preventing material from lodging in the hollow protrusion.

2. The method of molding a plastic container according to claim 1, wherein the diameters are between about 600 and 1000 microns.

3. The method of molding a plastic container according to claim 1, further including the step of providing flow-controlling surfaces in the mold at the area of the junction of the hollow protrusion and the material carrying compartment of the container for controlling the flow of the plastic material along the junction of the hollow protrusion and the material carrying compartment to cause a void at said junction to close as rotation of the mold occurs.

* * * * *